(12) United States Patent
Berlioz et al.

(10) Patent No.: US 6,232,890 B1
(45) Date of Patent: May 15, 2001

(54) COMBINED ALTITUDE AND HEIGHT-ABOVE-GROUND INDICATOR FOR AN AIRCRAFT

(75) Inventors: Raymond Jacques Gérard Berlioz, Salon-de-Provence; Vincent Frédéric Saintagne, Velaux; Joël Christian Roger Astruc, Puyricard, all of (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/191,372

(22) Filed: Nov. 13, 1998

(30) Foreign Application Priority Data

Nov. 13, 1997 (FR) .................................................. 97-14218

(51) Int. Cl.[7] .................................................. G08B 23/00
(52) U.S. Cl. .............................. 340/970; 340/977; 701/4
(58) Field of Search .................................. 340/970, 977, 340/946, 945, 963, 971, 973, 980; 73/178 R; 701/4, 5, 14; 244/17.11

(56) References Cited

U.S. PATENT DOCUMENTS

| 3,580,080 | 5/1971 | Perkins ................................. 73/384 |
| 3,595,077 | 7/1971 | Perkins ................................. 73/178 R |
| 3,890,614 | * 6/1975 | Argentieri et al. ...................... 340/977 |
| 3,936,797 | * 2/1976 | Andresen, Jr. ........................ 340/977 |
| 4,860,007 | * 8/1989 | Konicke et al. ...................... 340/977 |
| 5,136,301 | * 8/1992 | Bechtold et al. ...................... 340/977 |

FOREIGN PATENT DOCUMENTS

| 2273260 | 12/1975 | (FR) . |
| 2372417 | 6/1978 | (FR) . |
| 2409489 | 6/1979 | (FR) . |

* cited by examiner

*Primary Examiner*—Brent A. Swarthout
(74) *Attorney, Agent, or Firm*—Stevens, Davis, Miller & Mosher, L.L.P.

(57) ABSTRACT

A combined altitude and height-above-ground indicator for an aircraft enables the altitude and the height of an aircraft to be displayed simultaneously. The combined indicator includes a first sensor and a second sensor which respectively sense altitude and height above ground, means for processing the information supplied by the first and second sensors, and means for displaying the sensed altitude and height-above-ground information by superimposing the altitude and height-above-ground information on the same scale against a pointer. The scale includes a transparent first part which represents a pressure-altitude display, and a second part which is a mask positioned under the first part so that it masks the background of the indicator for altitude levels which are below the measured height above ground. An advantage of the indicator is the ability to incorporate into an altimetric indicator adjusted by a pilot a device capable of warning the pilot of an abnormal situation such as unintentional closeness to the ground as a result of poor altimeter adjustment.

6 Claims, 4 Drawing Sheets

COMBINED ALTITUDE AND HEIGHT-ABOVE-GROUND INDICATOR FOR AN AIRCRAFT

BACKGROUND OF THE INVENTION

1. Field of the Invention

The present invention relates to a combined altitude and height-above-ground indicator for an aircraft.

Although not exclusively, it is more particularly suited to helicopters liable to travel at low or very low heights above the ground.

2. Description of Related Art

Present-day altimeters present altitude information which simply shows a flying level given with respect to a fixed reference updated by the pilot. Furthermore, the height of the aircraft above the ground being overflown, measured by a radio altimeter, has to be consulted from another device, which has a different layout and a different origin. The altitude information and the height-above-ground information are therefore currently shown on two physically separate indicators which have different resolutions and different references even though they deal with the same physical parameters. These two items of information need to be monitored and correlated with one another during some phases of flight, and this leads to a heavy workload for the pilot.

However, American Patent U.S. Pat. No. 3,595,077 describes a combined indicator comprising:

- a first sensor and a second sensor which respectively sense altitude and height above ground;
- means of processing the measurements supplied by said first and second sensors; and
- means of displaying two types of information delivered by said processing means by superimposing said two items of information on the same scale against a pointer.

SUMMARY OF THE INVENTION

The object of the present invention is to improve such a combined indicator to allow the altitude and the height of the aircraft to be displayed simultaneously.

To this end, in the combined indicator in accordance with the present invention, said scale comprises a transparent first part which represents a pressure-altitude display and a second part which is a mask positioned under said first part so that it masks the background of the indicator for altitude levels which are below the measured height above ground.

Thus, the invention makes it possible to show, on a single indicator, with the same reference, the information regarding the pressure altitude and the information regarding the height above the ground being overflown. This indicator allows the pilot monitoring the flight altitude of the aircraft also to see how much height remains between the aircraft and the ground when this ground is approaching. The pilot can thus see the ground "rise up" toward the current-altitude pointer on the altimetric scale and is thus alerted to an excessive decrease in his height: he can therefore control his height using the indicator of the invention.

Advantageously, said mask is secured, at its free end, to a mask which denotes proximity to the ground.

According to another feature of the invention, said scale is a graduated vertical linear scale, the first part of which constitutes a strip scrolling past a stationary pointer.

Said scale may also be a circular scale comprising, as its first part, a moving graduated disk rotating past a stationary pointer In the latter two cases, there may be a window, the size of which is smaller than the altitude range shown by said first part and through which a portion of the latter can be seen.

According to yet another feature of the invention, said scale is a circular scale, comprising, as its first part, a stationary graduated disk and a moving pointer.

BRIEF DESCRIPTION OF THE DRAWINGS

The figures of the appended drawing will make it easy to understand how the invention may be achieved. In these figures, identical references denote similar elements.

DESCRIPTION OF THE PREFERRED EMBODIMENTS

Figure 1:
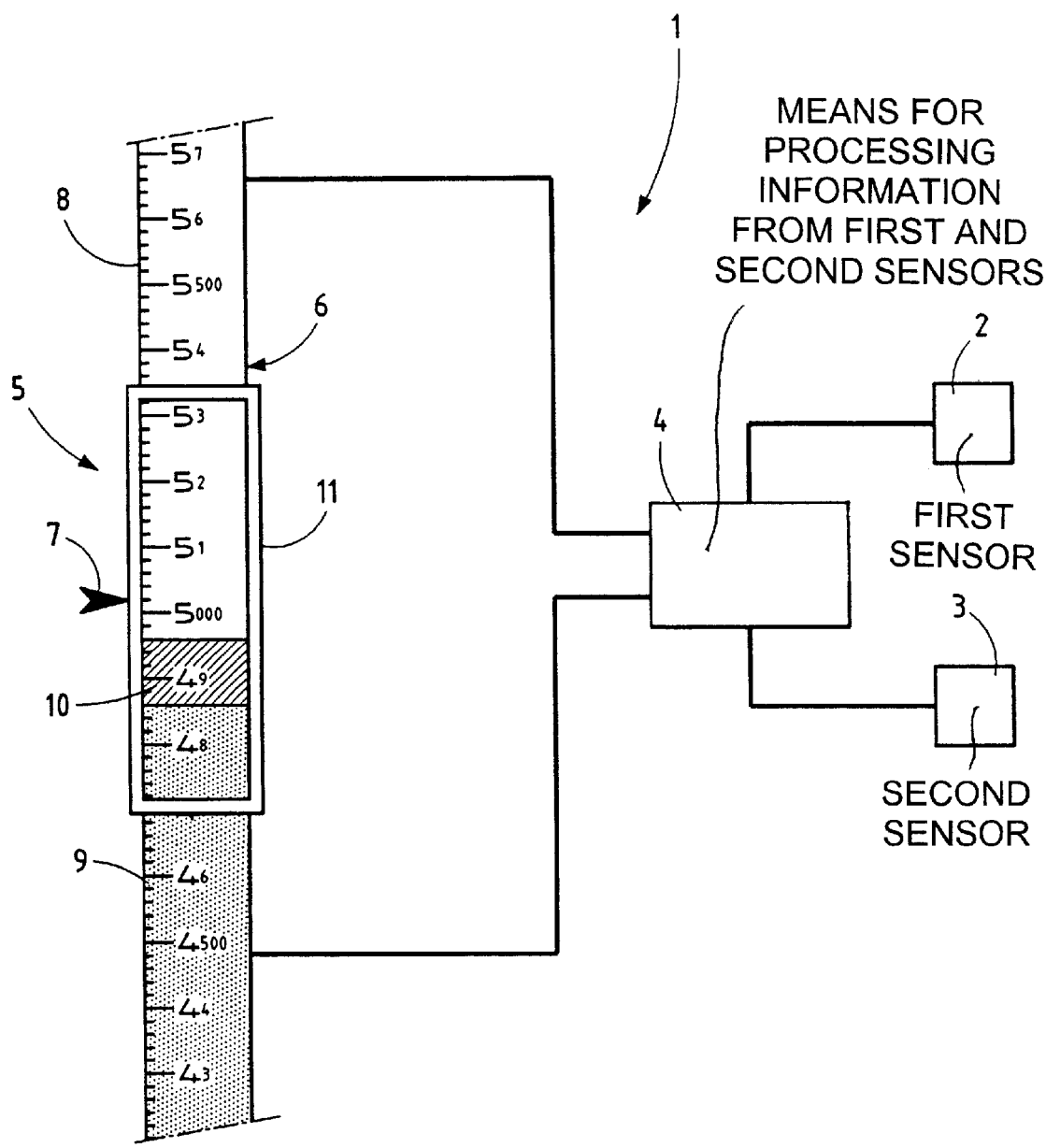
FIG. 1 diagrammatically illustrates one embodiment of an altitude and height-above-ground indicator for an aircraft according to the invention.

With reference to FIG. 1, the altitude and height-above-ground indicator 1 for an aircraft, comprises:

- a first sensor 2 which senses pressure altitude (altimeter),
- a second sensor 3 which senses the height above the ground (radioaltimeter),
- means 4 of processing the information supplied by the sensors 2 and 3, and
- means 5 of displaying said altitude and height-above-ground information by superimposing said two items of information on the same scale 6 against a pointer 7.

More specifically, the vertical linear scale 6, in the embodiment of FIG. 1, is split into two main parts:

- the first part 8 which represents the display of a pressure altitude, shown as a strip which can be graduated in feet (as depicted) showing the altitude (particularly with respect to sea level) and scrolling past the stationary pointer 7,
- the second part 9 which is a mask positioned under the strip 8, so that it masks the background of the indicator for altitude levels that are below the measured ground level.

The advantage of this indicator is that it is possible to incorporate, into an altimetric indicator adjusted by the pilot (and therefore subject to human error), a device capable of warning the pilot of an abnormal situation: in this particular instance, unintentional closeness to the ground as a result of poor altimeter adjustment.

The benefit of the scale 6 is that it shows the altitude of the aircraft and the distance to the ground against a single reference which is the current flying level of the aircraft (the position of the read-off pointer 7).

The display means 5 therefore comprises, in the embodiment depicted in FIG. 1:

- a "transparent" graduated strip 8, which can move vertically and carries the entire operating range of the altimeter,
- a stationary pointer 7 pointing to the current altitude on the strip 8,
- a strip (mask) 9 positioned under the strip 8 and indicating the ground,
- a strip (mask) 10 positioned under the strip 8 and showing, for example, the region between 0 and 100 feet above ground level, and a window 11, the size of which is smaller than the altitude range shown by the strip 8, through which a portion of the latter can be seen.

The way in which the indicator depicted in FIG. 1 works is thus as follows:

the strip 8 moves vertically past the pointer 7 which is stationary and identifies the analogue value to be displayed. Only a portion of the strip is seen through the reading window 11. The movement of the strip 8 is controlled by the altitude information produced by the sensor 2 and processed by the processing means 4, the strip 9 moves vertically under the strip 8. It covers the background of the indicator under the strip 8 for altitudes for which the height is less than 0. Its movement is controlled by the height-above-ground information produced by the sensor 3 and processed by the processing means 4, the strip 10 moves vertically under the strip 8, being fixed over the strip 9. It therefore moves with the latter.

Figure 4:
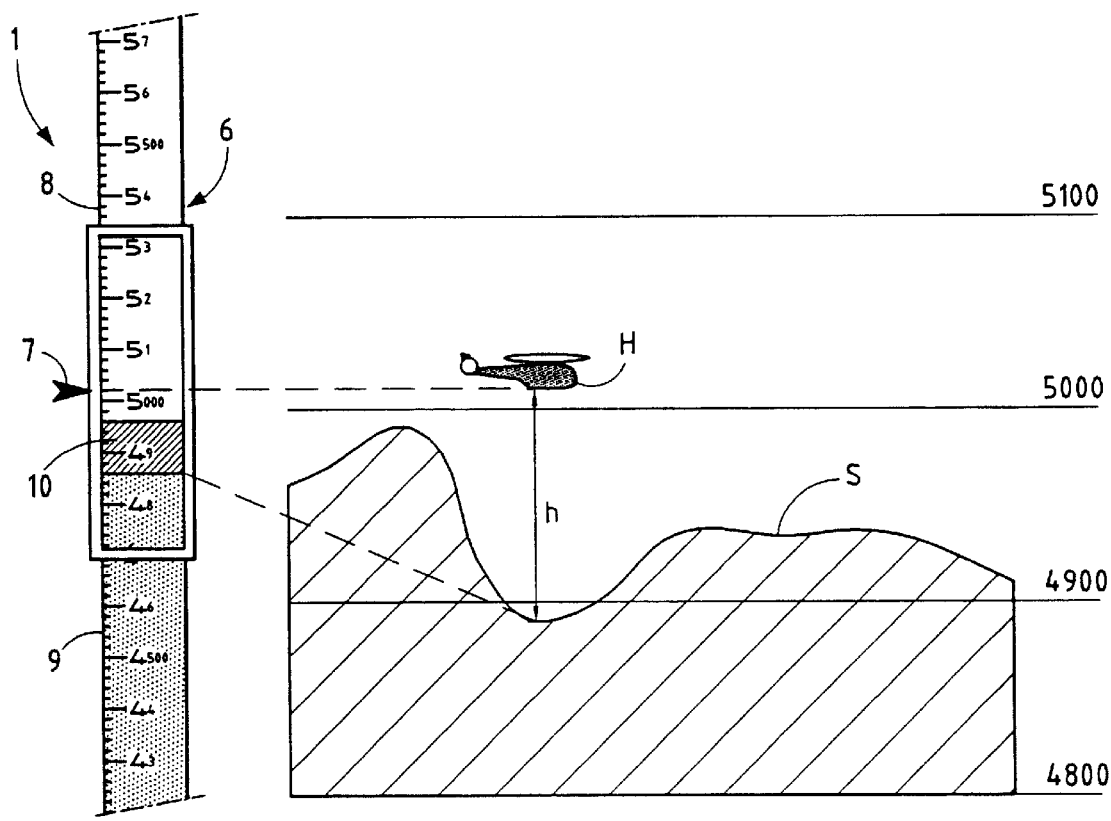
FIG. 4 shows on the indicator according to the invention, the altitude and height-above-ground information for a helicopter moving over variable-altitude ground.

FIG. 4 shows a helicopter H moving over some variable-altitude ground S. At the point where it is depicted, the helicopter H is a height h (for example 160 feet) above the ground S, as shown by the apparatus in FIG. 1. This FIG. 4 clearly illustrates the great advantage of the invention to a helicopter, for example, liable to travel at a very low height above "contorted" ground. It will be noted that, in this figure, the safety level (for example 100 feet) is not violated, and this can be seen immediately by the pilot because the upper end of the mask 10 is below the level of the pointer 7.

In summary, the above indicator, produced using mechanical or computerized means, is defined as follows:

the strip 8 shows the altitude scale. Its operating range can be defined from −2000 to 30,000 feet, the mask 9 shows the ground; this can occupy the entire operating range of the altitude scale, the mask 10 shows that the ground is approaching. It is of finite size and occupies a height corresponding, for example, to 100 feet above the strip that represents the ground.

The strip 8 scrolls past under the window 11 to show the current altitude measured by a pressure altimeter. The stationary pointer 7, situated at the middle of the reading window, points to this value.

The window 11 is defined in such a way that a portion of strip corresponding, for example, to ±300 feet, can be seen on each side of the pointer.

The mask 9, which corresponds to the ground, scrolls past over the strip 8 so that its upper edge is positioned at the current altitude minus the height measured by a radio altimeter. It covers the background of the indicator under all of the lower part of the strip 8. It is visible in the reading window and becomes usable when the height above the ground is less than, for example, 300 feet.

The mask 10, which shows that the ground is approaching, scrolls past over the strip 8 in such a way that its lower edge is securely attached to the upper edge of the mask 9. Its upper edge is positioned on the strip 8 at the current altitude minus the height above the ground, plus, for example, 100 feet. It thus becomes visible in the reading window 11 of the indicator when the measured height is below, in this example, 400 feet (300 feet under the read-off pointer 7 plus 100 feet for the height of the strip 10), to attract the pilot's attention.

Figure 5:
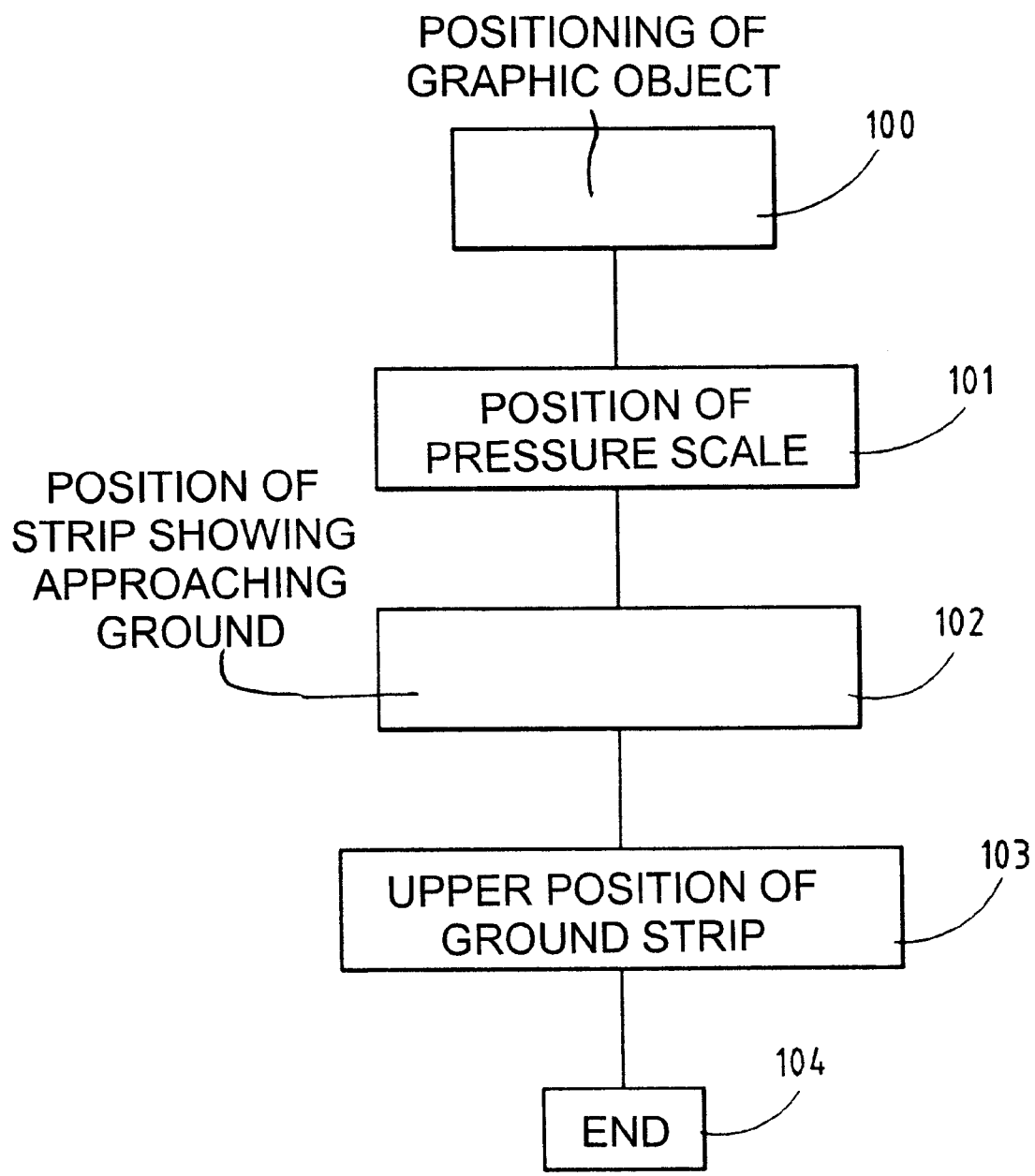
FIG. 5 shows an operating algorithm.

The operating algorithm can be defined as follows, with reference to FIG. 5 (the units used correspond to the resolution of the scale):

100: positioning of graphic objects

101: position of pressure scale=pressure altitude

102: position of the strip showing the approaching ground=pressure altitude=height from radio altimeter+100

103: upper position of ground strip=pressure altitude−radio altimeter height

104: end.

Figure 2:
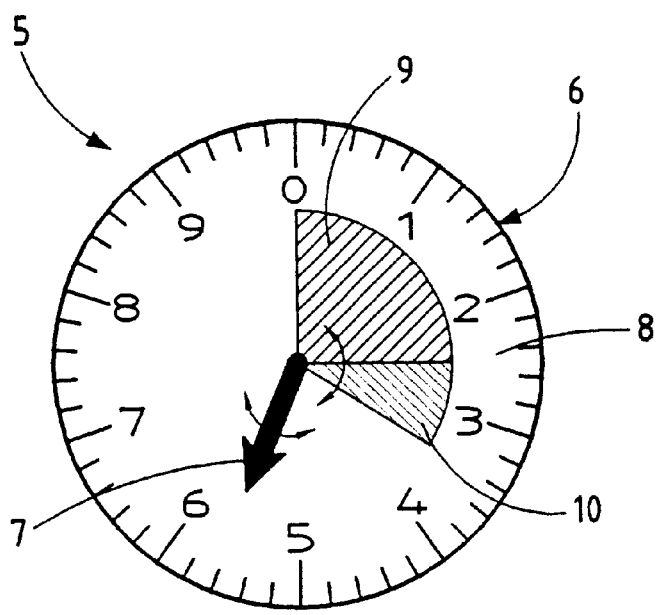
FIGS. 2 and 3 show two alternative forms of the display means of the indicator according to FIG. 1.
Figure 3:
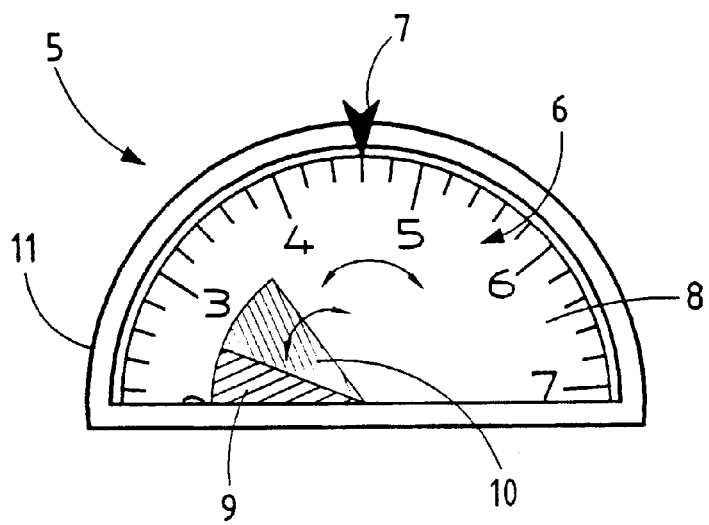

FIGS. 2 and 3 show two alternative forms of the display means 5 for the indicator according to the invention, with a circular scale 6.

In general, FIG. 2 shows a circular indicator, the scale 6 of which consists of a "transparent" stationary graduated disk 8 for indicating altitude, a moving pointer 7, a disk showing the ground 9 and a disk 10 showing that the ground is approaching.

Meanwhile, FIG. 3 shows an indicator in a semicircular reading window 11 and having, as its scale 6, a "transparent" moving graduated disk 8 for indicating altitude, a stationary pointer 7, a disk 9 showing the ground and a disk 10 showing that the ground is approaching.

The principle of operation of these two alternative forms is identical to the one described earlier. The same numerical references have been kept intentionally to emphasize this fact.

What is claimed is:

1. A combined altitude and height-above-ground indicator for an aircraft, said indicator comprising:

a first sensor and a second sensor which respectively measure altitude and height above ground;

means for processing the measurements supplied by said first and second sensors; and means for displaying two types of information delivered by said means for processing by superimposing said two types of information on a single scale against a stationary pointer, wherein said scale comprises a transparent first part which represents a pressure-altitude display which is movable, and a second part which is a movable mask positioned under said first part so that it masks the entire background of the indicator for altitude levels which are below said measured height above ground.

2. The indicator as claimed in claim 1, wherein said mask of said second part is secured, at its free end, to a second mask which denotes proximity to the ground.

3. The indicator as claimed in claim 1, wherein said scale is a graduated vertical linear scale and said pointer is stationary, and wherein said first part of said scale comprises a strip capable of scrolling past said stationary pointer.

4. The indicator as claimed in claim 1, wherein said scale is a circular scale, and wherein said first part of said scale comprises a movable graduated disk capable of rotating past stationary pointer.

5. The indicator as claimed in claim 3, said indicator comprising a window having a size which is smaller than the altitude range shown by said first part and through which a portion of said first part can be seen.

6. The indicator as claimed in claim 4, said indicator comprising a window having a size which is smaller than the altitude range shown by said first part and through which a portion of said first part can be seen.

* * * * *